UNITED STATES PATENT OFFICE.

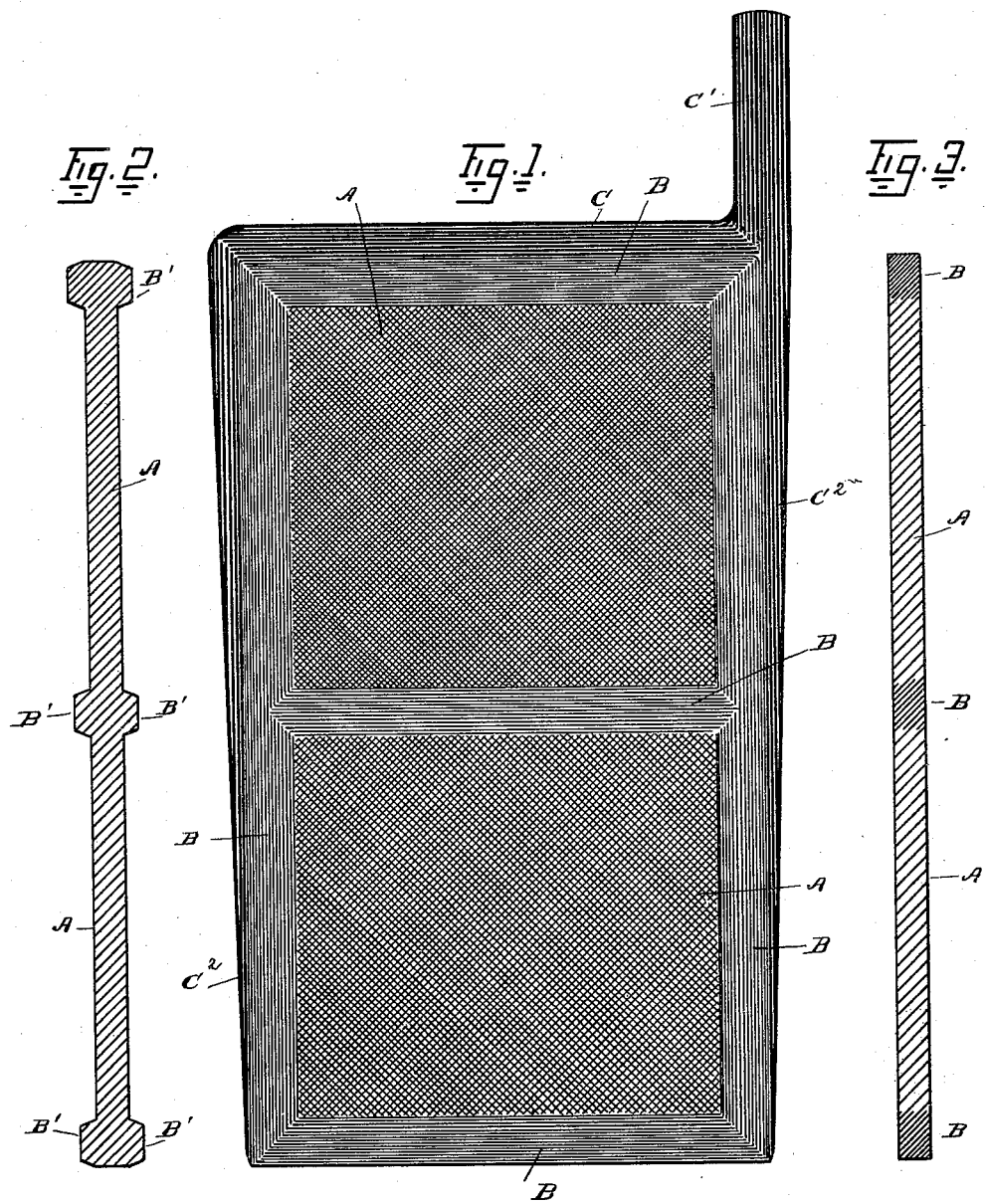

WILLIAM W. HANSCOM AND ARTHUR HOUGH, OF SAN FRANCISCO, CALIFORNIA, ASSIGNORS OF ONE-HALF TO J. O. B. GUNN AND E. H. POTTER, OF SAME PLACE.

ELECTRIC BATTERY.

SPECIFICATION forming part of Letters Patent No. 593,803, dated November 16, 1897.

Application filed April 21, 1897. Serial No. 633,160. (No model.)

*To all whom it may concern:*

Be it known that we, WILLIAM W. HANSCOM, a citizen of the United States, and ARTHUR HOUGH, a subject of the Queen of Great Britain, residing at San Francisco, in the county of San Francisco and State of California, have invented certain new and useful Improvements in Electric Batteries; and we do hereby declare the following to be a full, clear, and exact description of said invention, such as will enable others skilled in the art to which it most nearly appertains to make, use, and practice the same.

This invention relates to improvements in electrical batteries, and more particularly to storage batteries; and it consists in the construction and composition of the elements thereof. Heretofore the elements of these batteries have been constructed, preferably, of some form of lead, the lead on the one side of the charging-current being converted into spongy lead and on the other side into peroxid of lead. These two plates have in discharging given off an electrical current or energy proportionate to the bulk of the active material contained in them. This active material has been used with various forms of supports. Those forms most favorably received have been the grid. The grid has generally consisted of metallic-lead plates or frames having openings or perforations into which the active material has been placed and held mechanically. The purpose of the grid has been twofold—to-wit, that of supporting the active material and that of forming a contact for conveying the current from the active material. In the elements so constructed there has always existed one prominent objection, the avoidance of which is the principal object of this invention. This objection has been and is the formation of bodies or material chemically or electrochemically between the active material and the grid, which bodies when formed in the elements cause internal resistances detrimental to the batteries, as the quantity of the discharging-current is greatly affected thereby. A further objection has existed with reference particularly to those elements which have been constructed from some form of lead, which has been the overproduction within the active material of sulfate of lead of a certain electroresistance. This causes within the active material itself a diminution of the discharging-current, and to overcome this latter objection forms the further object of the present invention.

In the drawings, Figure 1 is a side view of a plate or element constructed in conformity with this invention. Fig. 2 is a cross-section of the active material as it appears in its spongy state prior to the ribs and edges being pressed. Fig. 3 is a cross-section of the same after the ribs and edges have been pressed, the heavier section-lines indicating the greater density of the pressed parts.

To facilitate the description with reference to the drawings, we will let the letter A indicate the active material, the letter B the pressed strengthening ribs or sections, and the letter C the strengthening contact-strip.

For the designation of any particular features of the various parts as above set forth we will use the letter of that part and raise its power by a numeral.

The active material used in this invention consists in the admixture of the litharge and cane-sugar, the latter being used in a relative percentage of from one to twenty per cent., according as the porosity of the plate is desired, the larger percentage giving greater porosity. These two components are thoroughly mixed and moistened with sulfate-of-ammonia solution, forming the same into a paste. The sulfuric acid contained in the sulfate of ammonia then enters slowly into combination with the litharge. This action is slow, transpiring only as the ammonia and the sulfuric acid become separated. The sulfate of lead thus produced forms a fine open network which constitutes a firm and integral support for the active material of the battery, but does not separate the particles of active material. It makes a perfect bond throughout the plate or element and aids substantially in the production of the pressed edges with which the plate is provided. As the ammonia is liberated from the sulfuric acid it enters into combination with the sugar and litharge to produce a chemical action between the two, the result of which is to produce sucrate of lead, which gives to the completed plate a tough quality and permits the handling of them without danger of damage. This also aids materially in the further step of pressing the edges and ribs by rendering the material so ductile that it can stretch into proper shape instead of cracking under the dies. The electrolytic forming by which the plate is reduced to spongy lead is similar to that in common use. During the process and as the same is being electrolytically formed the sugar is dissolved and renders the plate extremely porous, the particles of the sugar having separated the particles or atoms of the litharge as the same is formed into spongy lead. It is by means of the admixture of sugar in the composition that the objection above noticed of the production of sulfate of lead is overcome, there being no sulfuric acid in the sugar.

When the litharge and sugar are mixed and made into paste, as before described, the paste is placed in suitable molds of a shape to produce the cross-section shown in Fig. 2 of the drawings, having the enlargements B', from which the edges and strengthing-ribs B are subsequently formed. These ribs B are limited in size and number in order that the element may have as great a quantity of active material exposed as possible. When now the composition has been electrolytically formed until the material is in the proper condition of spongy lead, and while as it is termed "soft," meaning thereby that the particles are in a condition to adhere to each other closely, the slabs or blocks are placed in suitable molds or dies, and the enlarged portions or ridges B' are subjected to sufficient pressure to reduce them in cross-section to the surface of the plate to form compressed strengthening-ribs B, as shown in Fig. 3 of the drawings. Immediately these ribs are formed the plate is returned to its water-bath, or it may be carried forward to the next step in the production of the completed element, which is the affixing thereto of the frame C. By compressing the spongy lead to produce the strengthening-ribs B we have rendered the material in these strengthening-ribs of a metallic nature that will permit welding on the contact-frame C. This is done by casting ordinary metallic lead to the outside ribs B or by means of melting the frame to the edges with hydrogen-flame. The former method is that which is preferred, and it is rendered possible by means of the prior pressing to which the edges have been subjected. By thus welding the contact or frame to the edge the plate is strengthened for its use in a commercial way, while at the same time the contact between the active material and the contact-frame C is unimpaired, by the reason that it is an integral contact or weld, having no point of separation where sulfate of lead could be produced between the active material and the frame. This frame C is necessary to the production of the perfected plate, which would not otherwise be able to stand the rough usages to which these plates are subjected when in use, for the reason that the ribs B are not of sufficient strength to maintain the plates unimpaired unless handled with great care.

The frame C is provided with the lug C' and the two tapered extensions $C^2$, which extend down either side of the element, it being desired to use as small a quantity of this metallic lead as will readily convey the maximum discharge-current from the element and support the plate.

The plate produced by this invention we have found to be of very high efficiency, the reason of which, we are of the opinion, is that we have avoided in the construction, as far as it was possible, the production of sulfate of lead between the plate and contacts or frame and have constantly avoided the resistance which the presence of that material in the active material itself has generally caused. A battery so produced we have discovered has a useful life of greater duration than those heretofore used, for it has been rendered by the construction absolutely impossible for any sulfate to be formed between the contact or frame and the grid or supporting-ribs or between the supporting-ribs and the active material, as the whole has been constructed into a homogeneous mass.

While in this specification there has been only described one element, it will be naturally understood that both elements are intended to be produced by the same process, except as to the step wherein the active material in one is reduced wholly to spongy lead and in the other the edges only are reduced to spongy lead while the body is made peroxid of lead, but the strengthening-ribs and the contact-frame in both plates we find it best to construct identically.

Having thus described this invention, it is claimed—

1. The method of constructing elements for storage batteries consisting in mixing litharge and sugar, setting the same by adding sulfate of ammonia, dissolving out part of the sugar and electrolytically reducing to spongy lead substantially as described.

2. The method of constructing elements for storage batteries consisting in mixing litharge and sugar, then moistening the mixture with sulfate of ammonia to form the same into a paste, then molding the paste into a desired form, then reducing the same to spongy lead by electrolytically charging, and discharging it until formed, substantially as described.

3. The method of constructing elements for a storage battery, consisting in mixing litharge and sugar, then moistening the mixture with sulfate of ammonia to form the same to a paste, then molding the paste to form slabs having ridges of greater thickness than the body of the said slabs, then reducing the same to spongy lead by electrolytically charging and discharging it in a suitable electrolyte, then compressing the said ridges to a dense mass to form supports for the said elements, substantially as described.

4. The method of constructing elements for a storage battery consisting in mixing litharge and sugar then moistening the mixture with sulfate of ammonia to form the same into a paste, then molding the paste into a slab having ridges of greater thickness than the body of the slab, then reducing the same to spongy lead by electrolytically charging and discharging the same in a suitable electrolyte, then compressing the said ridges to the flush surface of the said slabs to form them into a denser mass to form supports for the said elements, substantially as described.

5. The method of constructing elements for storage batteries consisting in electrolytically producing slabs of spongy lead, then compressing the same about the edge to a dense mass, and welding metallic lead upon said compressed edge to form a frame, substantially as described.

In testimony whereof we have hereunto set our hands this 14th day of April, 1897.

WILLIAM W. HANSCOM.
ARTHUR HOUGH.

Witnesses:
BALDWIN VALE,
E. F. MURDOCK.